US005375312A

United States Patent [19]

Sakurai et al.

[11] Patent Number: 5,375,312

[45] Date of Patent: Dec. 27, 1994

[54] CRIMPING DEVICE

[75] Inventors: Eitarou Sakurai; Keisuke Matumoto, both of Daito, Japan

[73] Assignee: Nawaseikiseisakusho Corporation, Osaka, Japan

[21] Appl. No.: 62,540

[22] Filed: May 18, 1993

[30] Foreign Application Priority Data

May 22, 1992 [JP] Japan .............................. 4-34139[U]
Jun. 24, 1992 [JP] Japan .............................. 4-43842[U]

[51] Int. Cl.[5] .............................................. B23P 11/00
[52] U.S. Cl. .................................................. 29/243.5
[58] Field of Search ............. 29/243.5, 243.57, 243.58; 72/407

[56] References Cited

U.S. PATENT DOCUMENTS 3,027,155 3/1962 Paterson ................................ 269/32
3,914,845 10/1975 Olsson ................................ 29/243.5
5,090,101 2/1992 Welty ................................. 29/243.5

*Primary Examiner*—Robert C. Watson
*Attorney, Agent, or Firm*—Wegner, Cantor, Mueller & Player

[57] ABSTRACT

A crimping device having a reciprocating driven member which is moved back and forth at a rear end of a tubular body inside, a cam which is coupled to a front end of the reciprocating driven member through a link and can be swung with a pin as its fulcrum point, a caulking arm which is in forced contact with the cam at a rear end roller and has a front end claw freely going in and out of a caulking concave portion located at a front end of a main body and is carried by a separate pin at its intermediate portion, a return spring which returns the reciprocating driven member to an ordinary rear end position, and a return spring which always presses the roller onto a cam surface of the cam, the cam surface having such a shape as to push up the roller when the reciprocating driven member is moved forward.

3 Claims, 8 Drawing Sheets

CRIMPING DEVICE

TECHNICAL FIELD

This invention relates to a caulking device particularly suited for securing a corner piece to a flange of an air duct for air conditioning.

BACKGROUND OF THE INVENTION

FIG. 1 is a midway process of manufacture of a duct, in which a main duct 1 is formed into a rectangular tube by combining edges 2 of four surface treated steel plates by means of caulking or crimping, an L-shaped corner piece 5 shown in FIG. 2 is fitted to a corner 4 between adjoining flanges 3 and 3 in order to fill the corner 4, and a portion 6*a* of a bent piece 6 at tip end of the flange 3 corresponding to the corner piece 5 is bent over the corner piece 5 so as to secure the corner piece 5 as illustrated by FIG. 3. Conventionally, in order to bend the portion 6*a*, a method to tap or hit the portion 6*a* with a hammer has been employed. In this case, however, not only skill and labor are required but a large noise is emitted.

An object of this invention is to enable a caulking work without requiring skill and labor and, in addition, quietly.

SUMMARY OF THE INVENTION

This invention relates to a caulking or crimping device having a reciprocating driven member which is moved back and forth at a rear end of a tubular body inside, a caulking arm which includes a front end claw freely going in and out of a caulking concave portion located at a front end of a main body and carried by the main body through a pin, a link mechanism which couples the caulking arm to a front end of the reciprocating driven member so that the claw gets in the caulking concave portion when the reciprocating driven member is moved forward, and a return spring which returns the reciprocating driven member to an ordinary rear end position.

In more concrete terms, this invention relates to a crimping device having a reciprocating driven member which is moved back and forth at a rear end of a tubular body inside, a cam which is coupled to a front end of the reciprocating driven member through a link and can be swung with a pin as its fulcrum point, a caulking arm which is in forced contact with the cam at a rear end roller and has a front end claw freely going in and out of a caulking concave portion located at a front end of a main body and is carried by a separate pin at its intermediate portion, a return spring which returns the reciprocating driven member to an ordinary rear end position, and a return spring which always presses the roller onto a cam surface of the cam, the cam surface having such a shape as to push up the roller when the reciprocating driven member is moved forward.

The main body has a handle with a starting switch at its upper end.

The main body is made of aluminum, and the cam is supported by slitted internal surfaces of the main body within an area from its fulcrum point to a vicinity of the cam surface so that the cam is prevented from inclining.

A spacer for adjusting a bottom face height of the caulking concave portion is fitted in this concave portion in a detachable manner.

The claw has a projecting hooked portion at its front end lower surface, which protrudes in the caulking concave portion to clinch a workpiece.

The caulking device has a reciprocating driven member which is moved back and forth at a rear end of a tubular body inside, a cam which is coupled to a front end of the reciprocating driven member through a link and can be swung with a pin as its fulcrum point, a caulking arm which is in forced contact with the cam at a rear end roller and has a front end claw freely going in and out of a caulking concave portion located at a front end of a main body and is carried by a separate pin at its intermediate portion, a return spring which returns the reciprocating driven member to an ordinary rear end position, and a return spring which always presses the roller onto a cam surface of the cam. The cam surface has such a shape as to push up the roller when the reciprocating driven member is moved forward. The link is composed of one pair, holds at its rear end a tongue-like projection of metal fixture secured to a front end face of the reciprocating driven member so as to couple to the projection by a piston-side pin. The links hold the cam at their front ends so as to couple to the cam by a cam-side pin.

DESCRIPTION OF THE PREFERRED EMBODIMENTS

Figure 4:
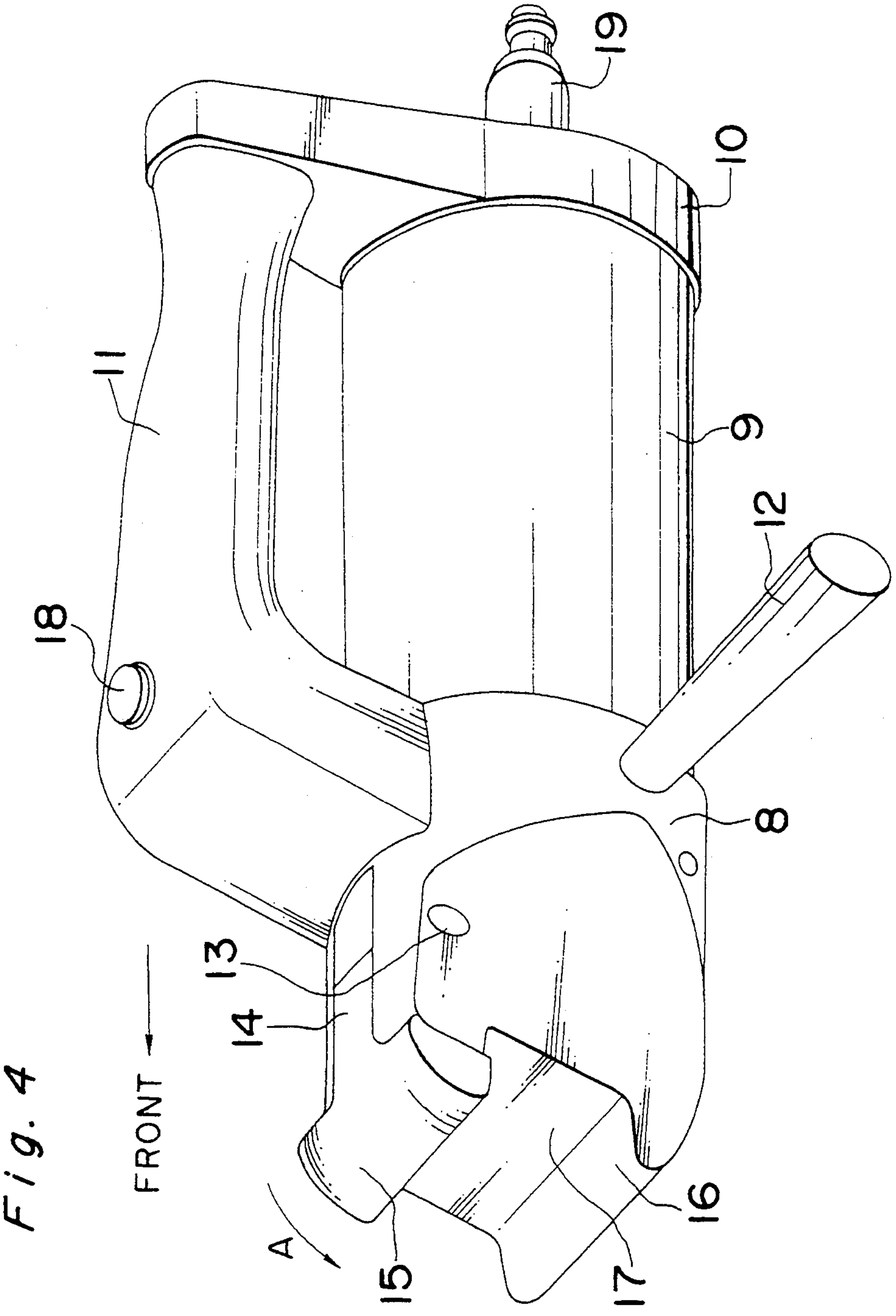
FIG. 4: This is an oblique view of a caulking device according to this invention.

In FIG. 4 showing the entire device, all of a main body 8, a cylinder 9, a cylinder head 10 (a tubular body being composed of them), a handle 11 and an auxiliary handle 12 (this may be omitted) are made of aluminum and combined into an integral assembly. A caulking arm 14 is carried by the main body 8 through a pin 13, and a caulking concave portion 17 is formed by a claw 15 located at tip end of the caulking arm 14 and a stationary mouth-piece 16 located at tip end lower part of the main body 8. A starting switch 18 (button) is installed at tip end of front face of the handle 11 so that it can be operated by a thumb of gripping right hand. When this starting switch 18 is pushed, a not-shown starting valve is opened and pressure air is supplied to an air inlet 19 through a rubber hose and the claw 15 is swung in a direction of arrow A by a mechanism which will be described later, so that a caulking work is thereby carried out.

Figure 5:
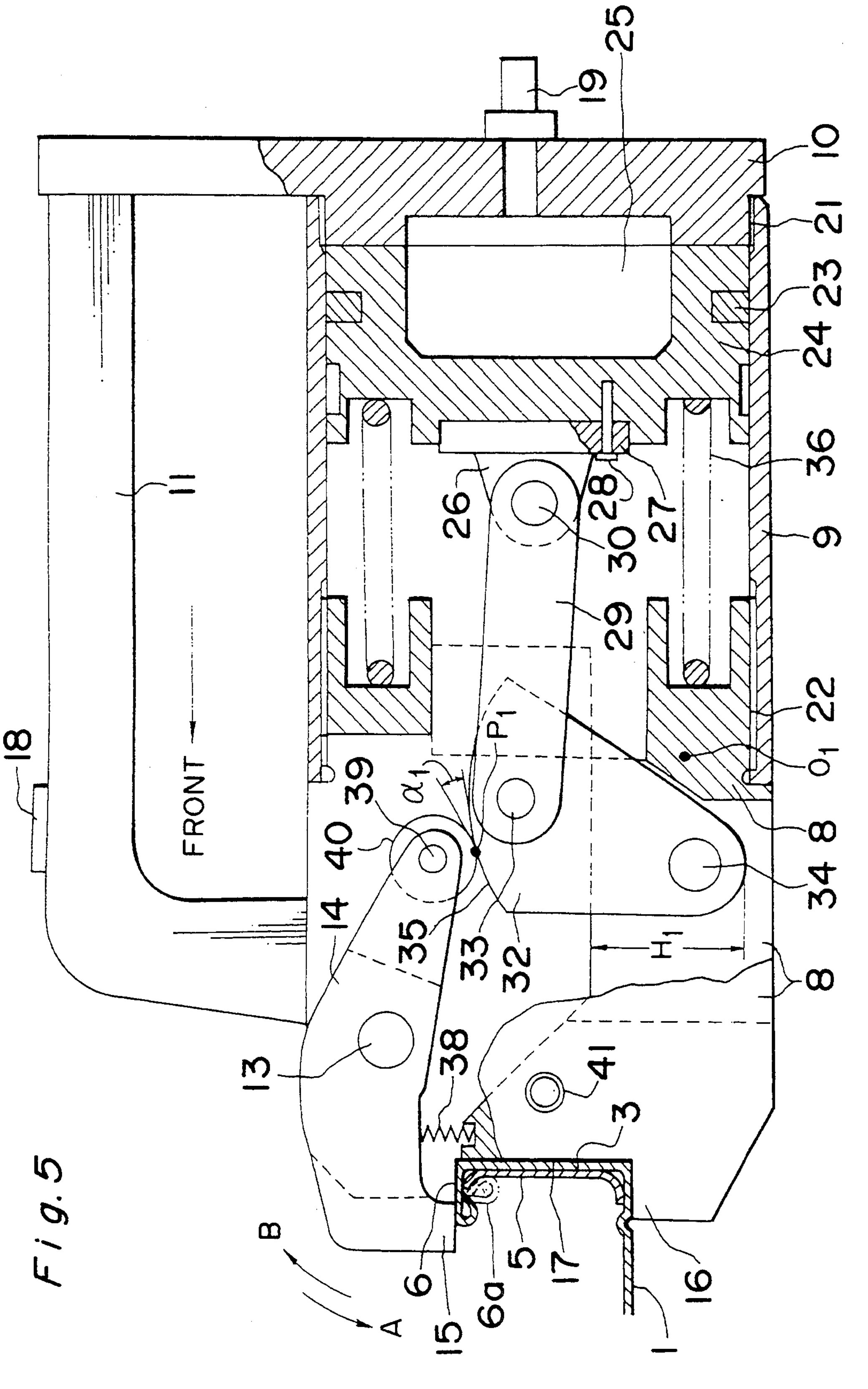
FIG. 5: This is a vertically sectional view.

In FIG. 5 showing a vertical section of FIG. 4, a rear end of the cylinder 9 is screwed onto the cylinder head 10 at its screw portion 21 through an O-ring (not shown) which maintains air-tightness, and its front end is screwed onto the main body 8 by a screw portion 22 in the same way. A piston 24 (reciprocating driven member) fits slidably in the cylinder 9 through a packing 23, and a pressure chamber 25 located between the piston 24 and the cylinder head 10 connects to the air inlet 19. A fixture 27 having a tongue-like projection 26 is secured to a central part of front face of the piston 24 by a screw 28. Rear ends of a pair of link 29 holding the projection 26 are coupled to the projection 26 by a pin 30. Front ends of the link 29 hold outer peripheral faces of a segmental plate cam 32, and are coupled to the plate cam 32 by a pin 33. The cam 32 is carried by the main body 8 through a pin 34, and provided at its upper end with a cam surface 35 composed of a part of circle having its center at a point 01 positioned at a backside of the pin 34. 36 is a return spring comprising a compression spring which ordinarily urges the piston 24 to the illustrated rear end position (when the pressure air is not supplied to the pressure chamber 25), and thereby the cam 32 is also kept at the illustrated waiting position.

A return spring 38 comprising a compression spring is in contact with the caulking arm 14 at its lower surface positioned at a slightly front of the pin 13 so as to give the arm 14 a moment shown by an arrow B, and a roller 40 supported by a pin 39 to a forked portion located at rear end of the caulking arm 14 is thereby in forced contact with the cam surface 35. 41 is a screw hole for fitting a spacer which will be described later.

Figure 1:
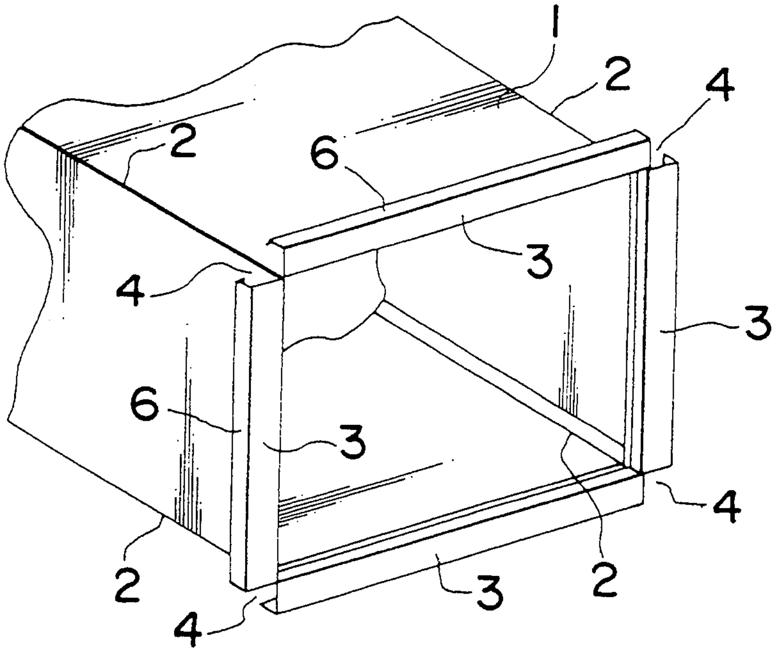
FIG. 1: This is an oblique view of a partially fabricated duct.
Figure 2:
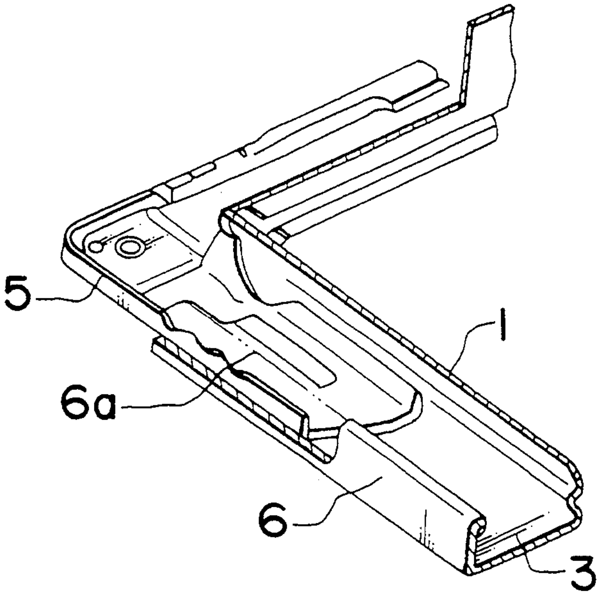
FIG. 2: This is a partially laterally sectional oblique view showing a state where a corner piece is fitted.
Figure 3:
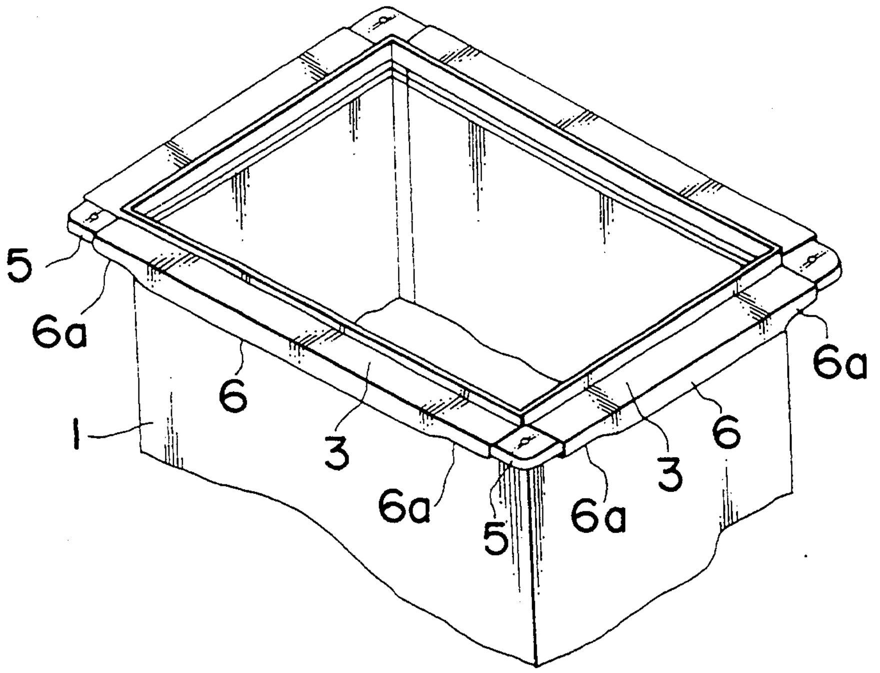
FIG. 3: This is an oblique view of a completed duct.
Figure 6:
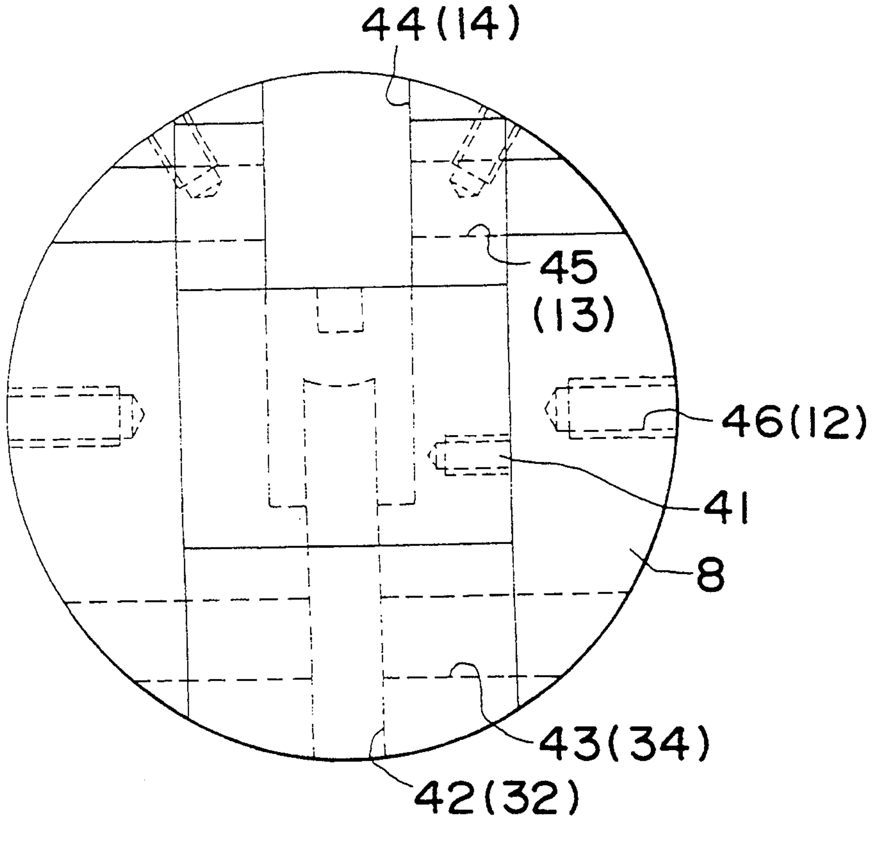
FIG. 6: This is a partial view of a front end face of FIG. 5.

In FIG. 6 showing a part of front face of FIG. 5, 42 is a slit for nicely supporting the cam 32 (FIG. 5), 43 is a hole for carrying the pin 34, 44 is a slit for nicely supporting the caulking arm 14, 45 is a hole for carrying the pin 13, and 46 is a screw hole in which the auxiliary handle 12 is screwed. The slit 42 holds the cam 32 from both sides with fine clearances left between them within a range of height of H1 in FIG. 5, so as to prevent the cam 32 from falling down. A distance (lift) between a contact point P1 of the cam surface 35 with the roller 40 and the pin 34 increases as the point P1 goes to a backside of the cam surface 35, however, a tangential angle between the cam surface 35 and the roller 40 is kept constant.

When a caulking concave portion 17 of FIG. 5 is fitted onto a flange 3 of a main duct 1 and a bent piece 6 (in which a corner piece 5 fits) and the switch 18 is pushed down, the pressure air is introduced from the air inlet 19 to the pressure chamber 25 and the piston 24 is moved forward against a spring force of the return spring 36. Then, the cam 32 is swung forward with the pin 34 as a center and the caulking arm 14 is swung in a direction A with the pin 13 as a center, so that the claw 15 caulks the bent piece 6 over the corner piece 5 as shown by 6*a*.

Figure 7:
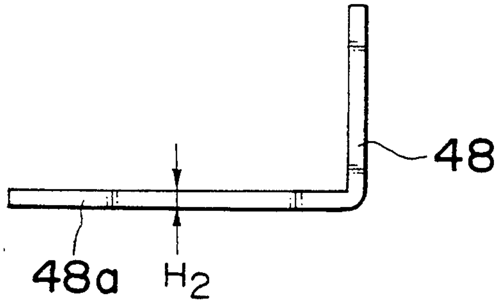
FIG. 7: This is a plan view of a spacer.
Figure 8:
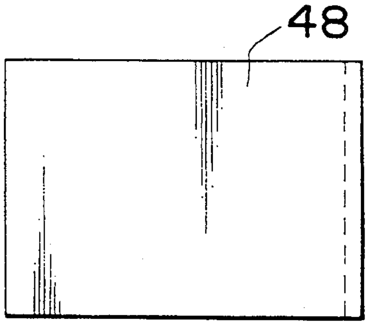
FIG. 8: This is a front view of a spacer.
Figure 9:
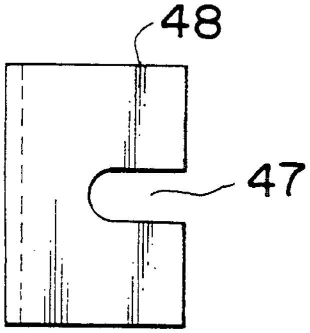
FIG. 9: This is a right side view of a spacer.
Figure 10:
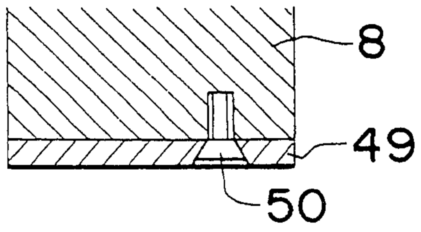
FIG. 10: This is a horizontally sectional view of another spacer.
Figure 11:
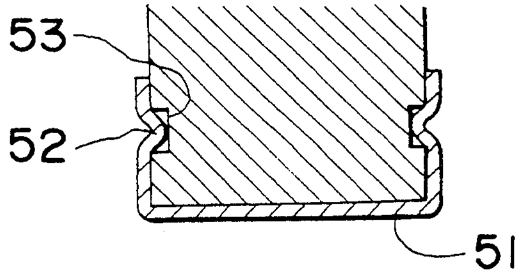
FIG. 11: This is a horizontally sectional view of further another spacer.
Figure 12:
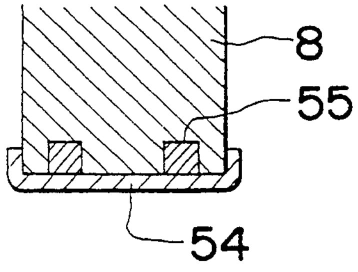
FIG. 12: This is a horizontally sectional view of still further another spacer.

Thicknesses of the flange 3 and the corner piece 5 may sometimes be changed by makers. To cope with this change, it is preferable to use a spacer 48 (FIG. 7 through FIG. 9) for raising a bottom face of the caulking concave portion 17 in order for enabling a change of depth of the caulking concave portion 17. A main spacer portion 48*a* of FIG. 7 having a thickness of H2 contacts with the bottom face of the caulking concave portion 17 to raise the bottom face by H2. 47 of FIG. 9 is a notch in which a screw (not shown) screwing in the screw hole 41 (FIG. 5) fits. A spacer 49 of FIG. 10 is fixed to the main body 8 by a machine screw 50. A spacer 51 of FIG. 11 is a pressed article having an U-section and its circularshaped projection 52 fits elastically in a groove 53. A spacer 54 of FIG. 12 is attracted by a magnet 55 buried in the main body 8. A reciprocating driven member moved forward and backward by a motor may be used in place of the air driven type piston 24 of FIG. 5.

Figure 13:
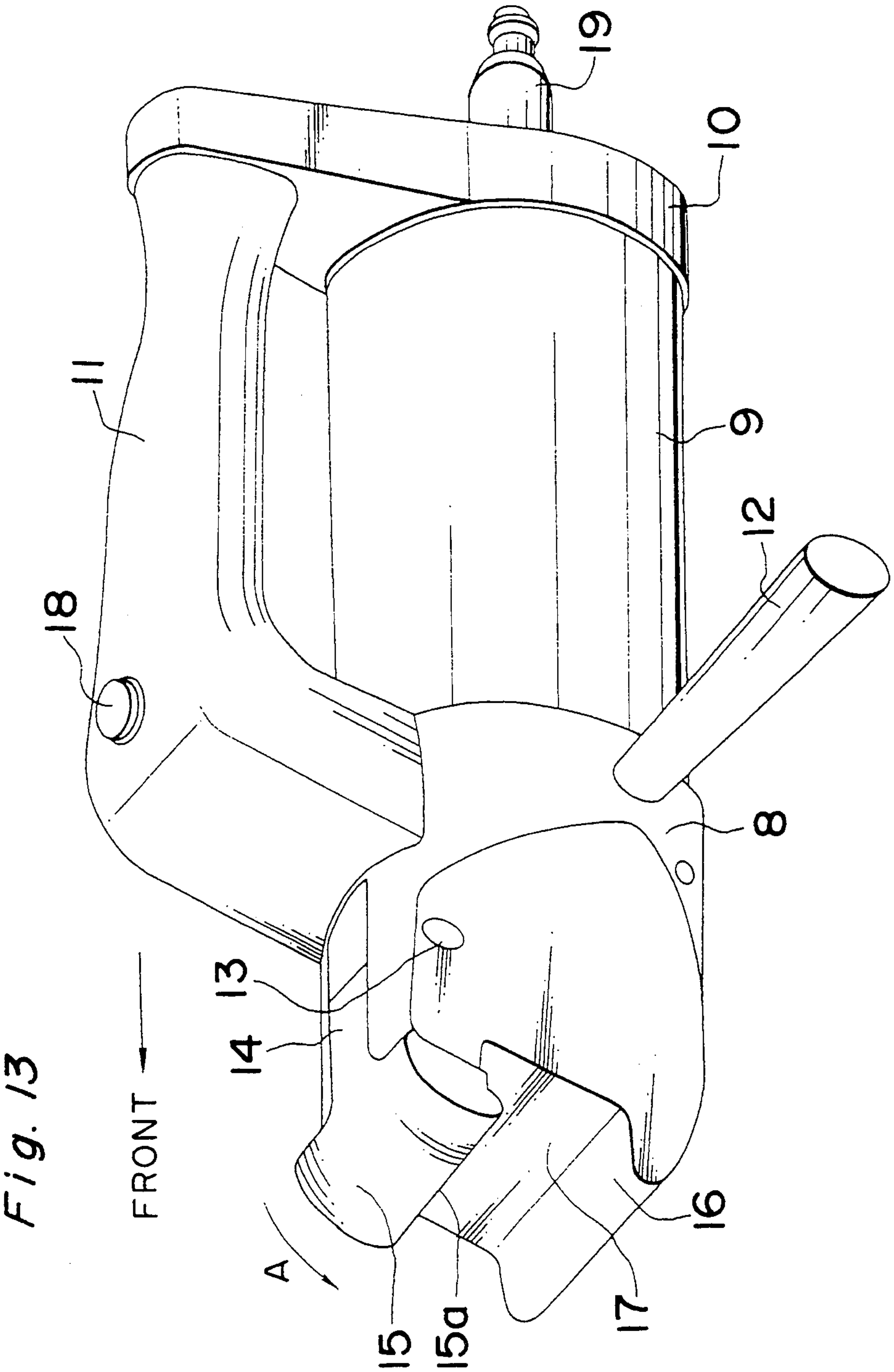
FIG. 13: This is an oblique view of a caulking device of another embodiment.

In FIG. 13 showing another embodiment, the claw 15 has at its front end lower face a hooked portion 15*a* having a circular sectional projection, which projects in the caulking concave portion 17 to clinch the bent piece 6 at an upper end of the flange 3 of workpiece.

Figure 14:
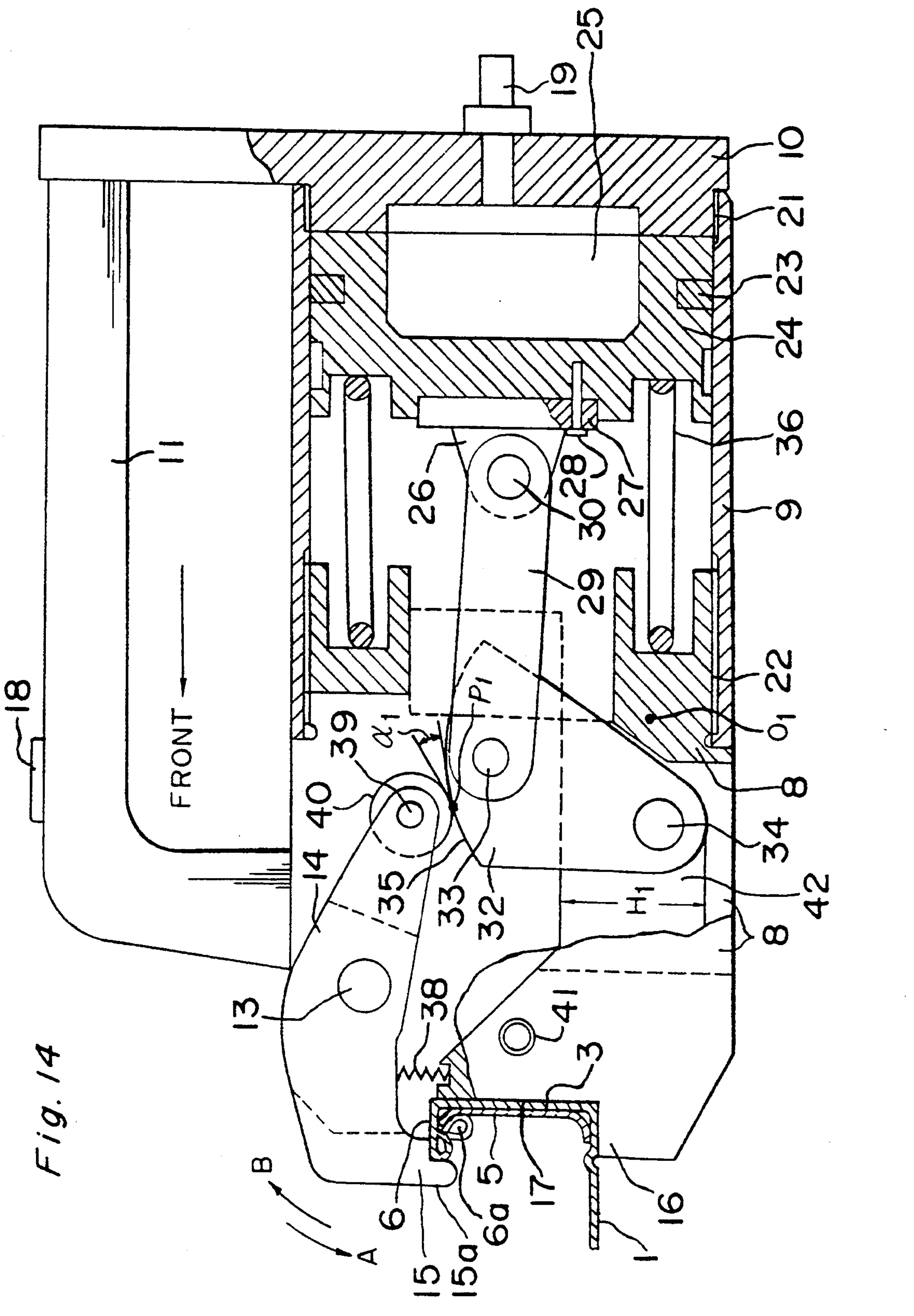
FIG. 14: This is a vertically sectional view of the caulking device of FIG. 13.

When the bent piece 6 is caught by a hook portion 15*a* of FIG. 14, the caulking concave portion 17 is fitted onto the flange 3 of the main duct 1 and the bent piece 6 (the corner piece 5 being fitted therein), and the switch 18 is pushed down; the air is introduced into the pressure chamber 25 and the piston 24 is moved forward against an elastic force of the return spring 36. Then, the cam 32 is swung forward with the pin 34 as a center, the caulking arm 14 is swung in the direction of A with the pin 13 as a center, and the hooked portion 15*a* of the claw 15 caulks the bent piece 6 over the corner piece 5 as illustrated by the portion 6*a*.

According to the present invention, a large caulking force can be exerted on the claw 15 portion by the cam 32 and the caulking arm 14 equipped with the roller 40, so that the caulking work can be carried out simply and quietly without requiring skill. Even when the handle 11 is not equipped, the work is enabled by holding the cylinder 9 portion with both hands.

The handle 11 can be operated by gripping it with a right hand only, for example, so that the work becomes easy and its efficiency is improved.

Not only a weight of the entire device is reduced and the operation becomes easy, but the cam 32 can be prevented securely from falling down and the caulking force can be transmitted to the roller 40 efficiently.

In addition, the device according to the present invention can be used effectively even when plate thicknesses of the corner piece 5 etc. are changed by makers.

A large caulking force can be exerted on the claw 15 portion by the cam 32 and the caulking arm 14 equipped with the roller 40, so that the caulking work can be carried out simply and quietly without requiring skill. Even when the handle 11 is not equipped, the work is enabled by holding the cylinder 9 portion with both hands. Since the hooked portion 15*a* (FIG. 13 & FIG. 14) are provided; the starting switch 18 can be pushed under a state where the flange 3 is in close contact with the caulking concave portion 17 and the work can be done accurately to improve a quality of product. Further, the flange 3 can be in close contact with and safely held to the concave portion 17 so that the work becomes more easy, in the event when a hand gripping the handle 11 is released at the moment of pushing the starting switch 18.

The cam 32 can be prevented from falling down and the forward and backward movements of the piston 24 can be transmitted to the cam 32 securely, so that a power transmission efficiency can be improved. Since a plate can be used for the link 29, a reduction in weight becomes easy.

What is claimed is:

1. A caulking device having a reciprocating driven member which is moved back and forth at a rear end of a tubular body inside, a caulking arm which includes a front end claw freely going in and out of a caulking concave portion located at a front end of a main body and carried by the main body through a pin, a link mechanism which couples the caulking arm to a front end of the reciprocating driven member so that the claw gets in the caulking concave portion when the reciprocating driven member is moved forward, and a return spring which returns the reciprocating driven member to an ordinary rear end position, in which the main body has a handle equipped with a starting switch at its upper end.

2. A caulking device having a reciprocating driven member which is moved back and forth at a rear end of a tubular body inside, a cam which is coupled to a front end of the reciprocating driven member through a link and can be swung with a pin as its fulcrum point, a caulking arm which is in forced contact with the cam at a rear end roller and has a front end claw freely going in and out of a caulking concave portion located at a front end of a main body and is carried by a separate pin at its intermediate portion, a return spring which returns the reciprocating driven member to an ordinary rear end position, and a return spring which always presses the roller onto a cam surface of the cam, the cam surface having such a shape as to push up the roller when the reciprocating driven member is moved forward, in which the main body is made of aluminum, and the cam is supported by slitted internal surfaces of the main body within an area from its fulcrum point to a vicinity of the cam surface so that the cam is prevented from inclining.

3. A caulking device having a reciprocating driven member which is moved back and forth at a rear end of a tubular body insider a cam which is coupled to a front end of the reciprocating driven member through a link and can be swung with a pin as its fulcrum point, a caulking arm which is in forced contact with the cam at a rear end roller and has a front end claw freely going in and out of a caulking concave portion located at a front end of a main body and is carried by a separate pin at its intermediate portion, a return spring which returns the reciprocating driven member to an ordinary rear end position, and a return spring which always presses the roller onto a cam surface of the cam, the cam surface having such a shape as to push up the roller when the reciprocating driven member is moved forward, in which a spacer for adjusting a bottom face height of the caulking concave portion is fitted in this concave portion in a detachable manner.

* * * * *